UNITED STATES PATENT OFFICE.

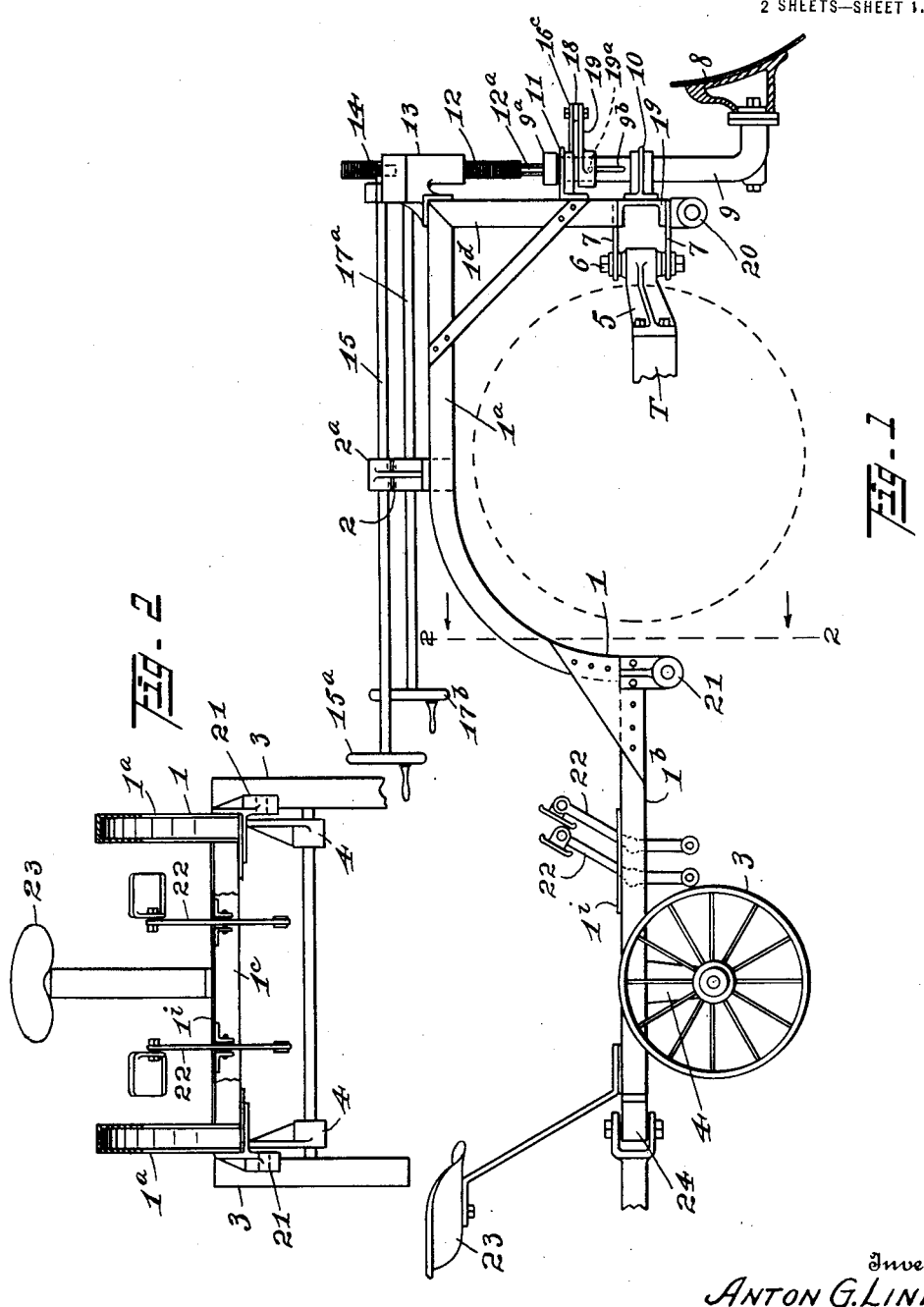

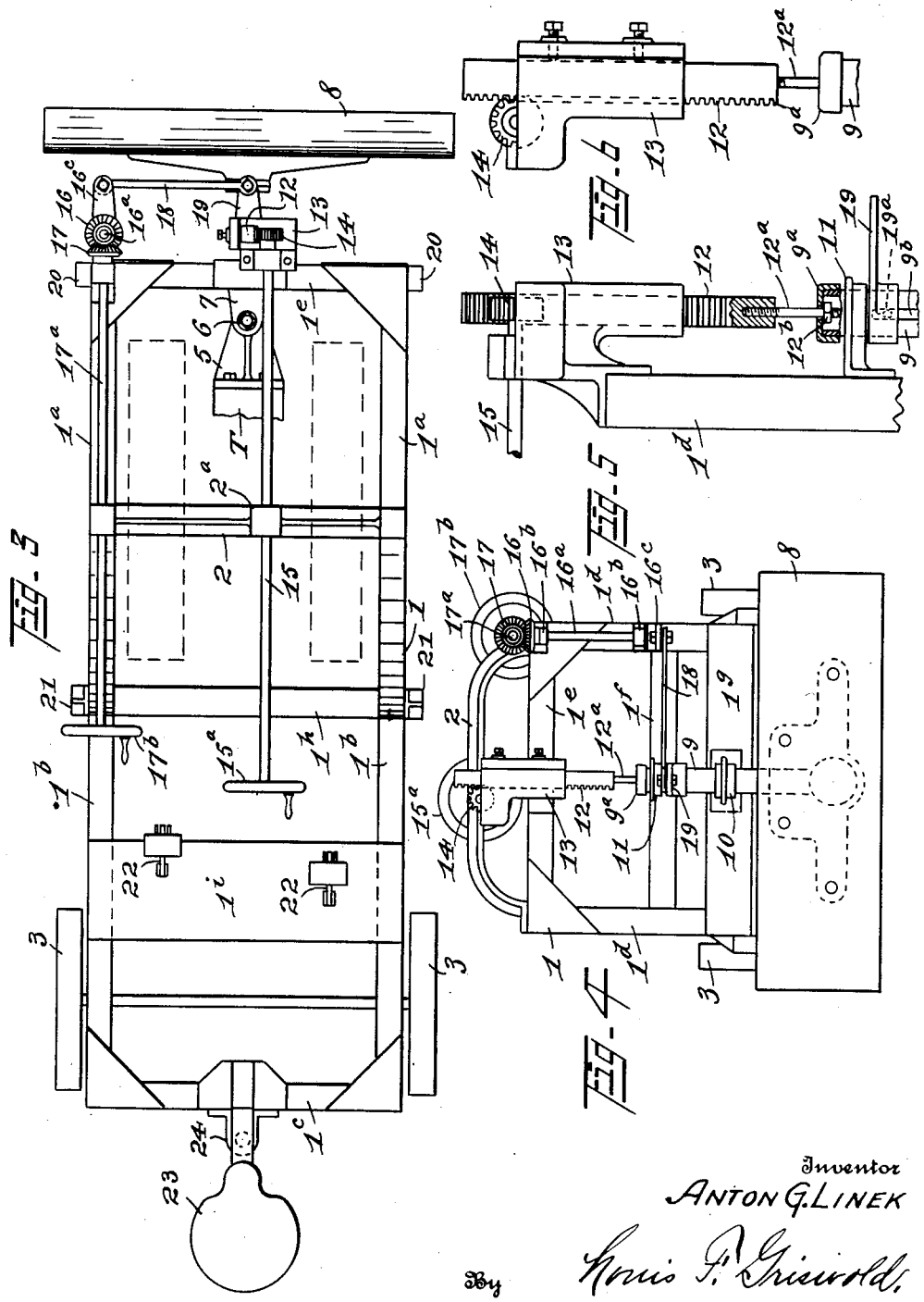

ANTON G. LINEK, OF NEWBURG HEIGHTS, OHIO.

UNIVERSAL HITCH FOR GARDEN TRACTORS.

1,403,969.  Specification of Letters Patent.  Patented Jan. 17, 1922.

Application filed December 8, 1920. Serial No. 429,189.

*To all whom it may concern:*

Be it known that I, ANTON G. LINEK, a citizen of the United States, residing at Newburg Heights village, in the county of Cuyahoga and State of Ohio, have invented certain new and useful Improvements in Universal Hitches for Garden Tractors, of which the following is a specification.

This invention relates to a structure adapted to be attached to a tractor, more particularly a garden tractor, as a connecting means or universal hitch for various implements to be driven by the tractor.

The primary object of the present invention is the provision of a structure of the character set forth that can be readily attached to a garden tractor, and that embodies hitching devices for different implements, said devices being so located that the correlative operation of the tractor and the implement is most effective.

The invention further provides means connected with the structure and adapted to be connected with the implements employed, for adjustment of said implements, said connecting means co-acting with the implement hitches.

With these and other apparent objects in view, the invention consists, essentially, in the construction, combination and arrangement of parts as hereinafter described and definitely pointed out in the appended claims, reference being had to the accompanying drawings which are made part of the specification, similar reference characters being employed to designate corresponding parts.

In the said drawings Figure 1 is a side elevation of an embodiment of the improved structure. Fig. 2 is a section taken on line 2—2 of Fig. 1. Fig. 3 is a plan view. Fig. 4 is a front end elevation, and Figs. 5 and 6 are fragmentary views, on an enlarged scale, illustrating details of construction and the operation of part of the hitch mechanism, as fully set forth in the following specification.

As above mentioned, the present invention resides in an accessory, or an auxiliary structure to be used in connection with a tractor. As the tractor is no part of the invention only a fragment of the body to which the improved auxiliary structure is attached, is shown in the drawings, the relative position of the traction wheels being shown in dotted lines in Figs. 1 and 3.

The present embodiment is adapted for attachment to a well known type of garden tractor, a fragment of the body of which is indicated at T. This embodiment provides a subsidiary frame 1 which is fabricated from structural steel channels fastened together and suitably braced in the manner well known to craftsmen in the structural steel art.

The frame 1 is of rigid construction, rectangular in general plan, and provides overhead clearance from the tractor, the side members $1^a$ being arched upward and over the tractor, as shown in Fig. 1. Lower horizontal plane side members $1^b$ extend rearwardly from the arched members and are connected by an end member $1^c$. The front of the frame has depending legs $1^d$, and transverse connecting elements $1^e$, $1^f$ and $1^g$. An intermediate transverse member $1^h$ is provided in the frame structure, and a yoke 2 spans the arch members $1^a$. Trailer wheels 3 are mounted in suitable bearings 4 which depend from the side frame elements $1^b$. The wheels 3 form the rear support for the subsidiary frame while the front of said frame is supported by the tractor body T in the following described manner. A bracket 5 is firmly attached to the tractor member T and is pivotally connected by means of a bolt 6 with bracket members 7 which extend rearwardly from the frame member $1^g$. The attachment thus formed allows an oscillating relation between the tractor and the subsidiary frame.

A salient feature of the invention is mechanism for adjustably connecting implements, such as snow-plows, road-scrapers, or other appliances, with the forward part of the frame 1, where they are pushed by the action of the tractor. The drawings illustrate a snow-scraper as the implement employed. The blade 8 is attached to an arm 9 which is mounted vertically in brackets 10 and 11 attached to the front of the frame 1. A vertically operating rack 12 has a swivel connection with the arm 9 through the medium of a rod $12^a$ passing through an aperture in the cap $9^a$ and provided with a head, or nut $12^b$. The rack 12 is mounted in a housing 13 attached to the front of the frame 1, and is in mesh with a pinion 14 which is carried on a rod 15. Said rod 15 extends over the top of the frame, through a bearing $2^a$ in the yoke 2, and is provided with a hand-wheel $15^a$. This rack and pinion mechanism being actuated by the hand-wheel 15ª provides for vertical adjustment of the implement.

Means are provided for oscillating the implement connected with the forward hitch. Said means comprises coacting bevel gears 16 and 17 carried on shafts 16ª and 17ª. The shaft 16ª is mounted in vertical bearings 16ᵇ attached to one of the vertical frame members 1ᵈ, and the shaft 17ª, which is the actuating member, is mounted horizontally in suitable bearings on top of the frame, and provided with a hand-wheel 17ᵇ. The shaft 16ª carries a crank member 16ᶜ, and a link 18 connects said crank 16ᶜ with a crank element 19 which is connected with the implement arm 9. The connection of the crank 19 with the arm 9 is made by means of a pin 19ª fixed in the member 19, which engages a vertical slot 9ᵇ provided in said arm 9. This allows vertical movement of the arm 9 with maintenance of oscillating connection of said arm with the crank 19.

Forward hitch elements 20, and similar intermediate elements 21 are attached to the frame 1 for the accommodation of various types of implements which may be employed. The said hitch members are so located relatively to the tractor as to provide for the most effective result from the particular class of implements employed. For instance, the hitches 20 are intended for the connection of plows or the like, which are the most effective when pushed, while the hitches 21 are used for the attachment of cultivators, harrows, or other implements that function more satisfactorily if operated in the rear of the traction elements, or under draft action.

The frame 1 is provided with a floor section 1¹ which carries levers 22, said levers being pivotally connected with the member 1ⁱ and extending below the same, providing means for suitable lever connections with the implements to be attached to the hitches 20 and 21, whereby said implements may be vertically oscillated. The levers 22 are preferably foot-levers and are so located as to be conveniently actuated by the operator from his position on the seat 23.

A trailer hitch 24 is attached to the extreme rear of the frame 1, said hitch being particularly serviceable for the draft of vehicles.

While I have shown and described an embodiment of my invention adaptable to a particular type of garden tractor, it will be understood that I am not confined to the specific construction set forth, as there may be various changes in the design, in the proportions and relative arrangement of parts to adapt the structure for attachment to tractors of this class, which differ in design. These modifications may be resorted to without departure from the spirit of the invention, or the scope of the claims.

Having described my invention, what I claim and desire to secure by Letters Patent is.

1. A universal hitch structure for tractors, comprising a subsidiary frame adapted to be pivotally connected with a tractor forward of the traction wheels, said frame extending rearwardly and over the tractor, implement hitch means on said frame forward of the pivotal connection, implement hitch means on said frame in the rear of the tractor, and trailer wheels mounted on said frame rearwardly in relation to the tractor.

2. In a universal hitch structure for tractors, the combination of a frame structure to be pivotally connected with a tractor, and forwardly supported thereby, said frame extending rearwardly over the tractor, wheels mounted under said frame for rearwardly supporting same, implement hitch elements attached to the forward part of the frame, similar elements attached to the frame between the supporting wheels on said frame, and the traction members of the tractor, and means connected with said frame for adjustment connections with implements operatively connected with said hitch elements.

3. In a universal hitch structure for tractors, the combination of a subsidiary frame to be pivotally connected with a tractor, and forwardly supported thereby, said frame extending rearwardly over the tractor, rear supporting wheels mounted under said frame, implement hitch elements attached to the forward part of the frame, similar elements attached to the frame between the supporting wheels and the traction members of the tractor to which said frame is attached, means connected with said frame for adjusting the implements to be operatively connected with the aforesaid hitch elements, and a trailer hitch element attached to the extreme rear of the frame.

4. In a universal hitch structure as an auxiliary to a tractor, the combination of a frame structure to be pivotally attached to the tractor forwardly, said frame extending rearwardly over the tractor, rear supports mounted on said frame, an implement support mounted vertically in brackets provided on the front of said frame, means for vertically adjusting said implement support, and means for oscillating said support.

5. In a universal hitch structure as an auxiliary to a tractor, the combination of a frame structure to be pivotally attached to the forward part of a tractor, said frame extending rearwardly over the tractor, rear supports mounted on said frame, a vertically disposed implement hitch attached to the forward part of said frame, an implement carrier mounted in said vertical hitch, means for vertically adjusting said carrier relatively to the frame, means for oscillating said carrier in the hitch elements, implement hitch elements laterally disposed on said frame forward of the tractor, similar elements laterally disposed on the frame in the rear of the tractor, and means connected with the frame for vertically adjusting implements to be mounted in said laterally disposed hitch elements.

6. In a universal hitch structure as an auxiliary to a tractor, the combination of a frame structure to be pivotally attached to the forward part of a tractor, said frame extending rearwardly over the tractor, rear supports mounted on said frame, vertically disposed hitch elements attached to the forward part of said frame, an implement carrier mounted in said hitch elements, a vertically disposed rack swivelly connected with said implement carrier, a pinion operative in said rack, means for actuating said pinion for imparting vertical movement to the rack thereby vertically adjusting the implement carrier, and means for oscillating said carrier.

7. In a universal hitch structure as an auxiliary to a tractor, the combination of a frame structure to be pivotally attached to the forward part of a tractor, said frame extending rearwardly over the tractor, rear supports mounted on said frame, vertically disposed hitch elements attached to the forward part of said frame, a vertically adjustable oscillatable implement carrier mounted in said vertical hitch elements, laterally disposed implement hitch elements attached to said frame forward of the tractor, laterally disposed hitch elements attached to the frame in the rear of the tractor, a trailer hitch attached to the extreme rear of the frame, mechanism for vertically adjusting the forward implement carrier, mechanism for oscillating said carrier, means connected with the frame for vertically adjusting implements to be mounted in the lateral hitch elements, said adjustment mechanisms, and means being operated from the frame in the rear of the tractor.

In testimony whereof I affix my signature.

ANTON G. LINEK.